(12) United States Patent
Sugiura

(10) Patent No.: US 7,534,347 B2
(45) Date of Patent: May 19, 2009

(54) METHOD FOR PURIFYING FLUID AND STATIC MIXER

(76) Inventor: Hikoroku Sugiura, 1569-1-817, Kaijincho-minami 1-chome, Funabashi-shi, Chiba 273-0024 (JP)

(*) Notice: Subject to any disclaimer, the term of this patent is extended or adjusted under 35 U.S.C. 154(b) by 211 days.

(21) Appl. No.: 10/574,841

(22) PCT Filed: Oct. 10, 2003

(86) PCT No.: PCT/JP03/13055
§ 371 (c)(1), (2), (4) Date: Aug. 22, 2006

(87) PCT Pub. No.: WO2005/035102
PCT Pub. Date: Apr. 21, 2005

(65) Prior Publication Data
US 2007/0045198 A1  Mar. 1, 2007

(51) Int. Cl.
C02F 1/78 (2006.01)
C02F 9/00 (2006.01)
B03D 1/14 (2006.01)
B01F 3/04 (2006.01)
B01F 5/00 (2006.01)

(52) U.S. Cl. .................. 210/221.2; 210/760; 210/631; 366/338; 366/340

(58) Field of Classification Search .............. 366/338, 366/339, 340; 138/40, 42, 44; 210/221.2, 210/760, 631
See application file for complete search history.

(56) References Cited

U.S. PATENT DOCUMENTS

| 5,779,361 A | 7/1998 | Sugiura |
| 5,887,977 A * | 3/1999 | Morikawa .............. 366/340 |
| 5,928,509 A * | 7/1999 | Sugiura ................ 210/221.2 |
| 6,112,768 A * | 9/2000 | Rath et al. ............ 366/338 |

FOREIGN PATENT DOCUMENTS

| EP | 0 829 305 A2 | 3/1998 |
| JP | 63-51927 A | 3/1988 |
| JP | 9-299776 A | 11/1997 |
| JP | 10-85723 A | 4/1998 |

* cited by examiner

Primary Examiner—Tony G Soohoo
(74) Attorney, Agent, or Firm—Sughrue Mion, PLLC (57) ABSTRACT

A method for purifying a fluid such as an exhaust gas and waste water, which comprises providing one or more of static mixers on the flow path of the fluid, and mixing and reacting the fluid with a depurative such as ozone in the static mixer to purify the fluid. The method for purifying a fluid allows the purification of a fluid such as an exhaust gas and waste water with significantly good efficiency, and also allows the simplification of an apparatus for use in the purification and the markedly reduction of the cost required for the purification.

11 Claims, 13 Drawing Sheets

METHOD FOR PURIFYING FLUID AND STATIC MIXER

TECHNICAL FIELD

The invention relates to a method for purifying a fluid and a static mixer suitable for use in the purification of an exhaust gas and waste water discharged from factories and the like.

BACKGROUND ART

Conventionally, examples of systems which are researched as methods for purifying an exhaust gas include a so-called scrubber system which an exhaust gas collected in a tank is sprayed a chemical solution to perform gas treatment, and a system which photocatalyst apparatuses serving as exhaust gas treatment facilities are arranged on an exhaust gas flow path in series to purify an exhaust gas. The system utilizing the photocatalyst apparatuses mentioned above applies to reduce from 500 to 1000 ppm of toluene to about 170 ppm thereof which is included exhaust gas flowing through the flow path of an exhaust gas at 400 L/min.

In this case, the system, which uses larger number of photocatalyst apparatuses arranged in series, applies to reduce more of toluene. However, a problem exists in that the cost required for the purification is increased with the number of photocatalyst apparatuses which are not low-priced, and this is the conventional subject that should be resolved.

DISCLOSURE OF THE INVENTION

The invention was carried out in consideration of such problems in conventional arts, and it is an object of the invention to provide a method for purifying a fluid and a static mixer which allows the purification of a fluid such as exhaust gas and waste water with significantly good efficiency in addition to the achievement of the simplification of an apparatus for use in the purification and the markedly reduction of the cost required for the purification.

As a result of assiduous examination to accomplish the object, the inventors found that the object could be achieved by utilizing a static mixer which is invented by the inventors themselves (Japanese Patent Application No. 8-143514), and then have accomplished the invention.

That is, a method for purifying a fluid of the invention comprises, in purifying a fluid such as an exhaust gas and waste water, utilizing a static mixer which is provided with a mixer main body which is arranged on a fluid flow path and is formed in a cylindrical shape having a diameter greater than that of the fluid flow path, the mixer main body comprising a mixer main body cylindrical unit, a hollow inlet disk unit having a hollow part which is positioned at the end of the mixer main body cylindrical unit and serves as an inlet, and a hollow outlet disk unit having a hollow part which is positioned at the other end of the mixer main body cylindrical unit and serves as an outlet, wherein a collision cylinder having a diameter greater than or equal to that of the inlet of the mixer main body and smaller than the inside diameter of the mixer main body cylindrical unit of the mixer main body is fixedly housed concentrically in the mixer main body so that the side of the opening of the collision cylinder faces to the inlet, a number of depressions are provided on at least one part of the interior face of the mixer main body and the surface of the collision cylinder which have contact with the fluid, arranging on the fluid flow path at least one of the static mixers, occurring a mixed reaction, for example an organic reaction, between the fluid, such as the exhaust gas and the waste water, and a depurative, such as ozone, thereby purifying the fluid.

Further, even when a static mixer improved on the aforementioned static mixer which has been invented by the inventors was used, it was found that the above object could be achieved, thus the invention has been accomplished.

In other words, a method for purifying a fluid of the invention comprises, in purifying a fluid such as an exhaust gas and waste water, Utilizing a static mixer which is provided with a mixer main body which is arranged on a fluid flow path and is formed in a cylindrical shape having a diameter greater than that of the fluid flow path, the mixer main body comprising a mixer main body cylindrical unit, a hollow inlet disk unit having a hollow part which is positioned at the end of the mixer main body cylindrical unit and serves as an inlet, and a hollow outlet disk unit having a hollow part which is positioned at the other end of the mixer main body cylindrical unit and serves as an outlet, wherein a collision cylinder having a diameter greater than or equal to that of the inlet of the mixer main body and smaller than the inside diameter of the mixer main body cylindrical unit of the mixer main body is fixedly housed concentrically in the mixer main body so that the side of the opening of the collision cylinder faces to the inlet, either a groove or a protrusion, or both is provided on at least one part of the interior face of the mixer main body and the surface of the collision cylinder which have contact with the fluid, arranging on the fluid flow path at least one of the static mixers, occurring a mixed reaction, for example an organic reaction, between the fluid, such as the exhaust gas and the waste water, and a depurative, such as ozone, thereby purifying the fluid.

In above case, as a preferable embodiment of the method for purifying a fluid of the invention, the static mixer includes the depression, the groove, and the protrusion which are provided on at least one part of the interior side of the bottom face of the collision cylinder, the inner peripheral face of the cylindrical part of the collision cylinder, the interior face of the hollow inlet disk unit of the mixer main body, and the interior face of the hollow outlet disk unit of the mixer main body.

Further, as a more preferable embodiment of the method for purifying a fluid of the invention, the static mixer includes the groove and the protrusion which are formed into a single or more threaded volute shape on a plane which has contact with the fluid and faces to the flow of the fluid, and are formed into a spiral shape on a peripheral face which has contact with the fluid and places along the flow of the fluid. As a further more preferable embodiment of the method for purifying a fluid of the invention, the static mixer includes the groove and the protrusion which are formed either on the interior side of the bottom face of the collision cylinder or the inner peripheral face of the cylindrical part of the collision cylinder, or both. As a still further more preferable embodiment of the method for purifying a fluid of the invention, the static mixer includes the collision cylinder into which either the upstream side end of the outlet cylindrical part of the hollow outlet disk unit or the upstream side end of the downstream side fluid flow path is protruded.

In a method of purifying a fluid and a static mixer of the invention, the interior face of a mixer main body and the surface of a collision cylinder which have contact with a fluid refer to:
1) the upstream side of the bottom face of the collision cylinder
2) the inner peripheral face of the cylindrical part of the upstream side than the bottom of the collision cylinder
3) the outer peripheral face of the cylindrical part of the collision cylinder
4) the interior face of the hollow inlet disk unit of the mixer main body
5) the interior face of the hollow outlet disk unit of the mixer main body
6) the inner peripheral face of the mixer main body cylindrical unit
7) the downstream side of the bottom face of the collision cylinder
8) the inner peripheral face of the cylindrical part of the downstream side than the bottom of the collision cylinder.

Where the outlet cylindrical part of the hollow outlet disk unit or the downstream side fluid flow path is protruded into the collision cylinder, these parts (9) are referred as the interior face of the mixer main body which have contact with a fluid.

Here, as shown in a static mixer which is disclosed in the Japanese Patent Application Number 8-143514 invented by the inventors of the present invention, a "depression" in a method for purifying a fluid and a static mixer of the invention refers a small hole having a semicircular shape, a rectangular shape, or a triangular shape at cross section, and is allowed to be randomly provided on the interior face of the mixer main body and the surface of the collision cylinder which have contact with a fluid.

Further, a "groove" in a method for purifying a fluid and a static mixer of the invention refers a groove which is formed in linear shape on a plane by subjecting a grooving processing, and also a thing which is formed in linear by attaching a plate member on a plane, and is allowed to have either a straight linear shape or a curved line shape. It is not limited that the "groove" is formed in a continuous line. The "groove" may be formed in a discontinuous line. Preferably, the "groove" which is provided on a flat face having contact with a fluid and facing to the flow of the fluid, that is 1), 4), 5), and 7) described above, is formed a single or more threaded volute shape, and the one which is provided on a peripheral face having contact with a fluid and placing along the flow of the fluid, that is 2), 3), 6), 8), and 9) described above, is formed a spiral shape.

A "protrusion" in a method for purifying a fluid and a static mixer of the invention refers a lump or a baffle plate which is provided on a plane and has a hemispheric shape or a trigonal pyramidic shape. Preferably, the "protrusion" which is provided on a flat face having contact with a fluid and facing to the flow of the fluid, that is 1), 4), 5), and 7) described above, is arranged as shaping a single or more threaded volute, and the one which is provided on a peripheral face having contact with a fluid and placing along the flow of the fluid, that is 2), 3), 6), 8), and 9) described above, is arranged as shaping a spiral.

In a method for purifying a fluid and a static mixer of the invention, a fluid, such as an exhaust gas and waste water, and a depurative which run into a mixer main body flow into a collision cylinder and collide with the upstream side of the bottom face thereof to become a turbulent flow, and therefore, a large eddy current is generated near the bottom of the collision cylinder.

In above case, the mixer main body which is formed in a cylindrical shape has a diameter greater than that of a fluid flow path. Therefore, when the fluid and the depurative flow into the mixer main body cylindrical unit of the mixer main body, the pressure therein is reduced to pull back the eddy current mentioned above, and then, the action of mixing and stirring vigorously between the fluid which flows in consecutively and the fluid which turns around is provided.

In addition, a depression, a groove, or a protrusion is provided on at least one part of the interior face of the mixer main body and the surface of the collision cylinder which have contact with the fluid. Therefore, when the fluid and the depurative are collided with the depression, the groove, or the protrusion, a rotating flow and/or a turbulent flow is generated every concavities and convexities to mix and stir between the fluid and the depurative, and then, combined with the large eddy current mentioned above, allows to mix and stir between the fluid, such as the exhaust gas and the waste water, and the depurative extremely efficiently, that is, allows to purify efficiently the fluid mentioned above.

Besides, in a method for purifying a fluid and a static mixer of the invention, the space of a flow path between the opening of a collision cylinder and an inlet in a static mixer does not become narrower. Therefore, the pressure near the inlet of a mixer main body is infallibly reduced.

In a method for purifying a fluid and a static mixer of the invention, a collision cylinder maybe concentrically fixed in a mixer main body in the intermediary of fixing boards which are radically protruded from the outer peripheral face of the collision cylinder and each of the ends of which is connected to the inner peripheral face of a mixer main body cylindrical unit. Additionally, the fixing board is twisted at a predetermined angle around the axis of the collision cylinder, then, at the moment that the fluid and the depurative are passed through the said part, an overall large spiral flow is created to change the direction of the flow. This enables the more efficiency of mixing and stirring.

Further, in a method for purifying a fluid and a static mixer of the invention, where a spiral ribbon is provided on the inner peripheral face of an inlet part, a spiral flow is created from a fluid and a depurative which pass through the inlet part, and are collided to the interior side of the bottom face of a collision cylinder to become a more complicated turbulent flow. This enables the more efficiency of mixing and stirring. In a method for purifying a fluid and a static mixer of the further more preferred embodiment of the invention, an outlet cylindrical part or a downstream side fluid flow path is protruded into a mixer main body of a static mixer. Therefore, the mixed flow of a flow and a depurative, when flowing out from an outlet part, has to climb over the outlet cylindrical part or the downstream side fluid flow path which is protruded into a collision cylinder, then the mixed flow is changed the direction of the flow at also the part. This enables the furthermore efficiency of mixing and stirring.

BEST MODE FOR CARRYING OUT THE INVENTION

Hereinafter, the invention will be explained in more detail by examples; however, the invention is not limited to what is shown in the examples.

Figure 1:
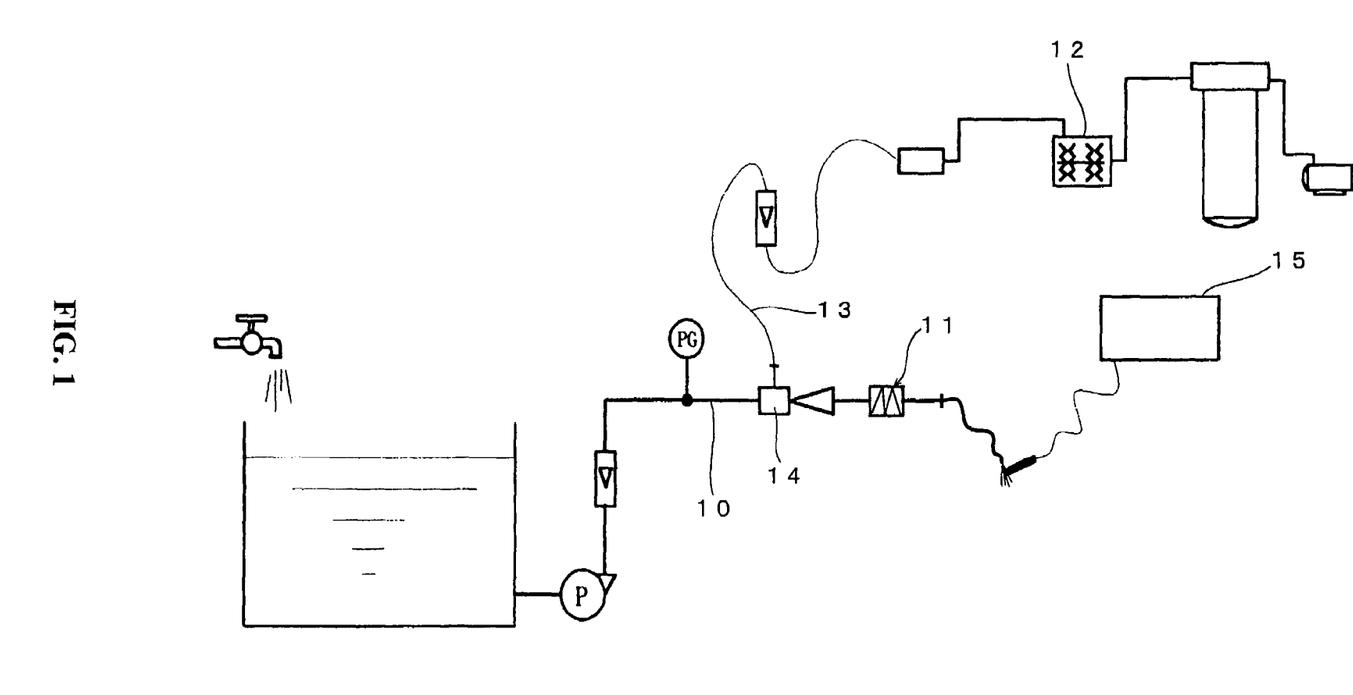
FIG. 1 is an explanatory diagram of a pipe arrangement showing one embodiment of a method of purifying a fluid of the invention.
Figure 2:
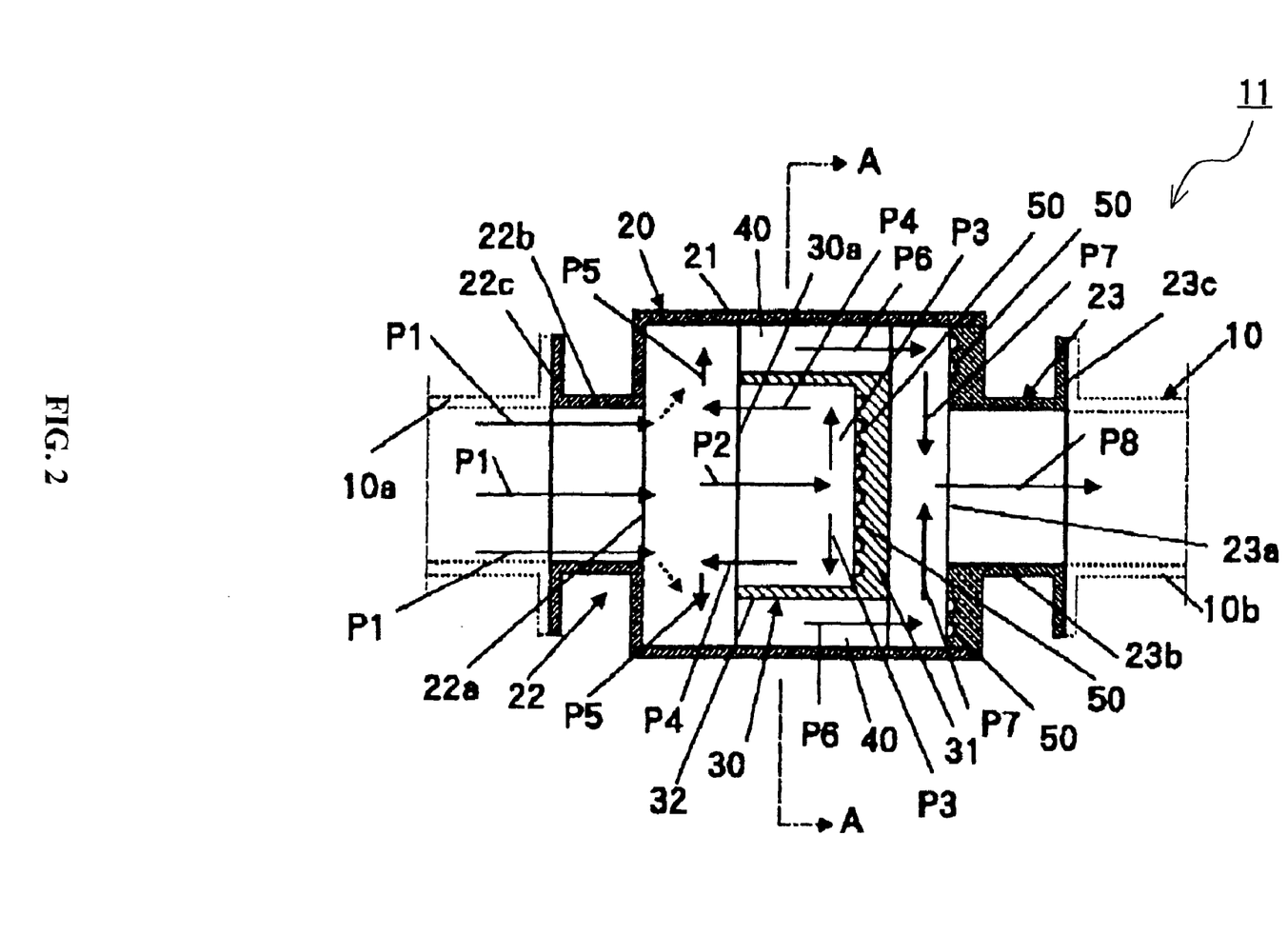
FIG. 2 is a cross sectional explanatory diagram of the static mixer placed in the pipe arrangement showing FIG. 1.
Figure 3:
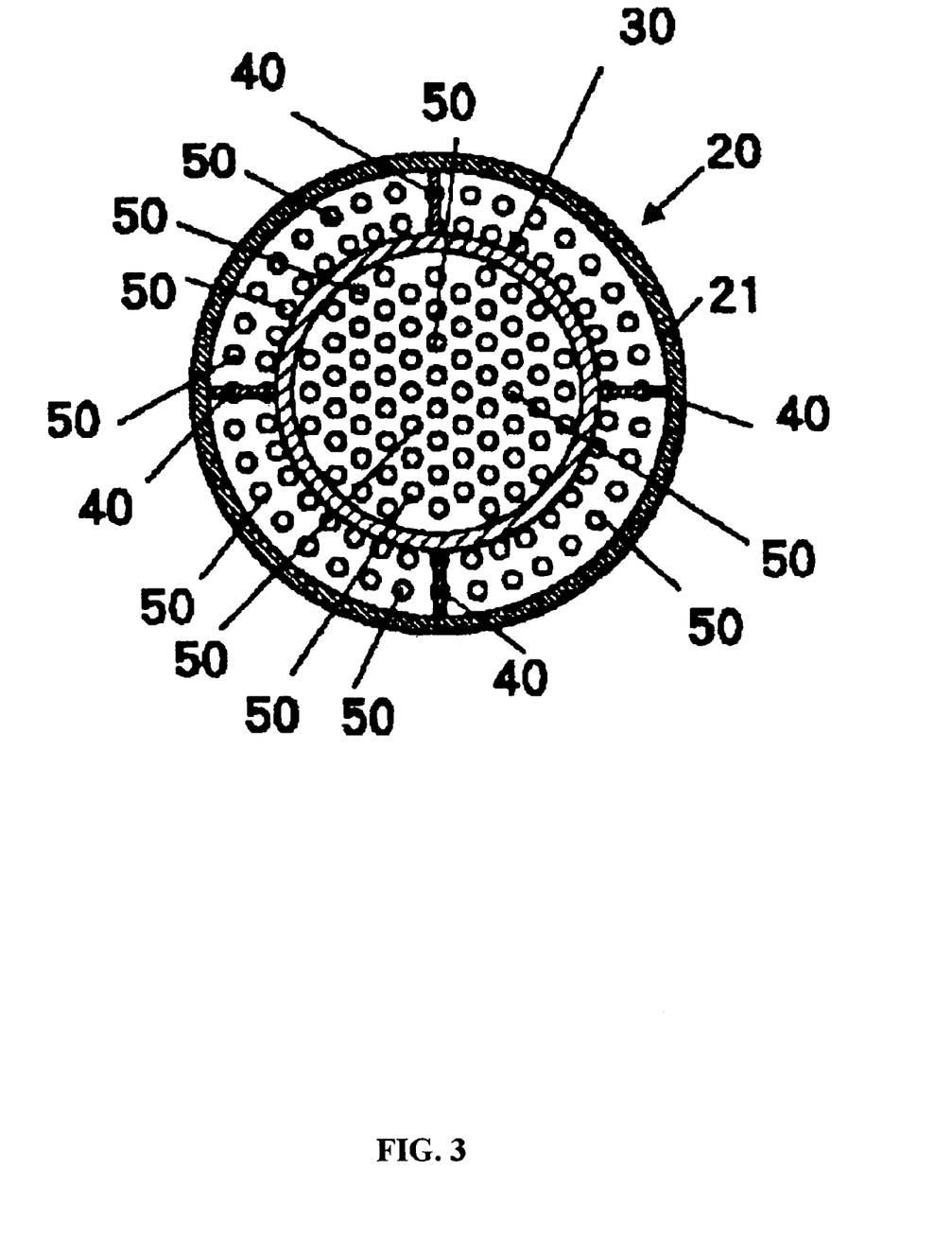
FIG. 3 is a sectional explanatory diagram A-A of a static mixer in FIG. 2.

FIGS. 1 to 3 show one example of a method of purifying a fluid of the invention.

In FIG. 1, the reference number 10 denotes a fluid flow path of an exhaust gas, that is an exhaust gas fluid, and the exhaust gas which contains toluene flows through the fluid flow path 10 at 140 L/min.

In purifying of the exhaust gas which flows through the fluid flow path 10, besides arranging the static mixer 11 on the fluid flow path 10, an ozone gas feed passage 13 which leads from an ozone gas feeding device 12 is communicated with the upstream side of the static mixer 11, and ozone gas, with a gas concentration of 24g, which is fed from the ozone gas feeding device 12 is mix-reacted with an exhaust gas to purify the exhaust gas.

In this case, as shown in FIG. 2, the fluid flow path 10 mentioned above comprises an upstream side fluid flow path 10a and a downstream side fluid flow path 10b, a mixer main body 20 of the static mixer 11 is connected between the upstream side fluid flow path 10a and the downstream side fluid flow path 10b. The mixer main body 20 comprises a mixer main body cylindrical unit 21 which has a diameter greater than that of the fluid flow path 10, a hollow inlet disk unit 22 which is attached the end of the mixer main body cylindrical unit 21 and has a hollow part serving as an inlet 22a, and a hollow outlet disk unit 23 which is attached the other end of the mixer main body cylindrical unit 21 and has a hollow part serving as an outlet 23a.

In the illustrative embodiment shown in the figure, an inlet cylindrical part 22b is protruded outward from the inlet 22a and a flow path connecting flange part 22c is attached to the end of the inlet cylindrical part 22b. Similarly, an outlet cylindrical part 23b is protruded outward from the outlet 23a and a flow path connecting flange part 23c is attached to the end of the outlet cylindrical part 23b.

Then, the flow path connecting flange part 22c mentioned above is connected to the downstream end of the upstream side fluid flow path 10a, the flow path connecting flange part 23c is connected to the upstream end of the downstream side fluid flow path 10b, the mixer main body 20 is communicated with the fluid flow path 10 as a component thereof, and an exhaust gas and an ozone gas flow from the upstream fluid flow path 10a through the mixer main body 20 to the downstream side fluid flow path 10b.

Further, the mixer main body 20 includes a collision cylinder 30 which has a diameter greater than or equal to that of the inlet 22a and smaller than the inside diameter of the mixer main body cylindrical unit 21. The collision cylinder is fixedly housed concentrically so that the side of the opening 30a thereof faces to the inlet 22a, by the intermediary of fixing boards 40 which are radically protruded from the outer peripheral face of the collision cylinder 30 and each of the ends of which is connected to the inner peripheral face of the mixer main body cylindrical unit 21.

In the application inclusive of the illustrative embodiments shown in the figures, the fluid flow path 10, the inlet cylindrical part 22b, and the outlet cylindrical part 23b have the isometric diameters. Then, "a diameter greater than or equal to that of the inlet 22a" mentioned above equates to "a diameter greater than or equal to that of the fluid flow path 10". However, although not shown in the figure, the fluid flow path 10, the inlet cylindrical part 22b, and the hollow outlet disk unit 23 allow having different diameters each other, including the case which the diameter of the downstream side of the inlet cylindrical part 22b may be made smaller than that of the fluid flow path 10 in a nozzle shape. In other words, when the inlet cylindrical part 22b is made a smaller diameter in the downstream side, the inlet 22a has a diameter smaller than that of the fluid flow path 10, and then the case which the inlet cylindrical part 22b has a diameter smaller than or equal to that of the fluid flow path 10 and greater than or equal to that of inlet 22a is also included.

The above collision cylinder 30 is formed in a cylindrical shape having a bottom. Although a cylindrical part 32 thereof is a straight cylinder which has a diameter measuring a same length in any position thereof in principle, a cylindrical part may be widened or narrowed in some measure at the side of the opening 30a, and also may be provided with a disk which is attached on the opening 30a and is centrally provided with a through hole having a diameter smaller than that of the opening 30a. The opening 30a of the collision cylinder 30 having a smaller diameter brings out enhancing the efficiency of stirring but increasing a pressure loss. On the contrary, the opening 30 thereof having a greater diameter brings out going down the efficiency of stirring in a measure but reducing a pressure loss.

Accordingly, the inlet 22a and the opening 30a of the collision cylinder 30 are opposite to each other, and almost all the exhaust gas and the ozone gas which run in from the inlet 22a as shown by an arrow P1 flow into the collision cylinder 30 as shown by an arrow P2. The exhaust gas and the ozone gas which are moved the outer periphery side of the collision cylinder 30 as shown by an arrow P3 overflow from the collision cylinder 30 as shown by arrows P4. The exhaust gas and the ozone gas which is overflowed from the inside of the collision cylinder 30 are rubbed with another exhaust gas and ozone gas which is flowed in from the inlet 22a, that is, the flow in the direction of the arrow P1 is rubbed with the flow in the direction of the arrow P4. The collision cylinder 30 has a diameter greater than that of the inlet 22a, then in the collision cylinder 30, the exhaust gas and ozone gas around the central axis flow toward the bottom face 31, that is in the direction of the arrow P1, and these around peripheral wall reverse and flow toward the opening 30a, that is in the direction of the arrow P4.

The exhaust gas and the ozone gas which overflow from within the collision cylinder 30 are moved toward the side of outer peripheral face as shown by an arrow P5, pass through between the collision cylinder 30 and the mixer main body cylindrical unit 21 as shown by an arrow P6, and flow toward the downstream side. The exhaust gas and the ozone gas which passed through between the collision cylinder 30 and the mixer main body cylindrical unit 21 to flow in the direction of the arrow P6 are collided with a hollow outlet disk unit 23 and are turned the direction of flowing toward the canter as shown by an arrow P7. Then, the exhaust gas and the ozone gas which flow from all direction are to the direction indicated arrows P7 collided each other and flow out from an outlet 23a shown by an arrow P8.

When the exhaust gas and the ozone gas mutually collide and change the flow direction thereof to turn around, that is to flow just in the opposite direction, and as a matter of course, these gases are stirred very strongly, with a extremely large pressure loss. Therefore, a collision board-type static mixer as mentioned above has not be put to practical use. However, the static mixer of the invention, which comprises the mixer main body 20 having a diameter greater than that of the fluid flow path 10, that is that of the inlet 22a, makes the pressure of the vicinity of the periphery border of the downstream side of the inlet 22a reduce by an orifice action due to the flow of the exhaust gas and the ozone gas. The aforementioned reduced pressure zone helps the exhaust gas and the ozone gas to collision each other, change the direction of flowing, and turn around for the benefit of reducing the pressure loss.

Further, a number of depressions 50 are formed on at least any one of the upstream side of the bottom face 31 of the collision cylinder 30, the interior face of the hollow inlet disk unit 22, the interior face of the hollow outlet disk unit 23, the inner peripheral face of the cylindrical part 32 of the collision cylinder 30, the inner peripheral face of the mixer main body cylindrical unit 21, the outer peripheral face of the cylindrical part 32 of the collision cylinder 30, the downstream side of the bottom face 31 of the collision cylinder 30.

In the embodiment shown in FIG. 2 and FIG. 3, the depressions 50 are formed on the interior side of the bottom face 31 of the collision cylinder 30 and the upstream face of the hollow outlet disk unit 23. When the faces mentioned above, on which the exhaust gas and the ozone gas most vigorously collide, are formed a number of depressions 50, the exhaust gas and the ozone gas which collide with each of the depressions 50 generate a number of small eddy flows, that is a differential agitation, to be stirred and mixed more finely, and the fine eddy flows ride on the overall big reverse flow, that is an integral agitation. As stated above, the depression 50 has such a strong agitation action.

Figure 4:
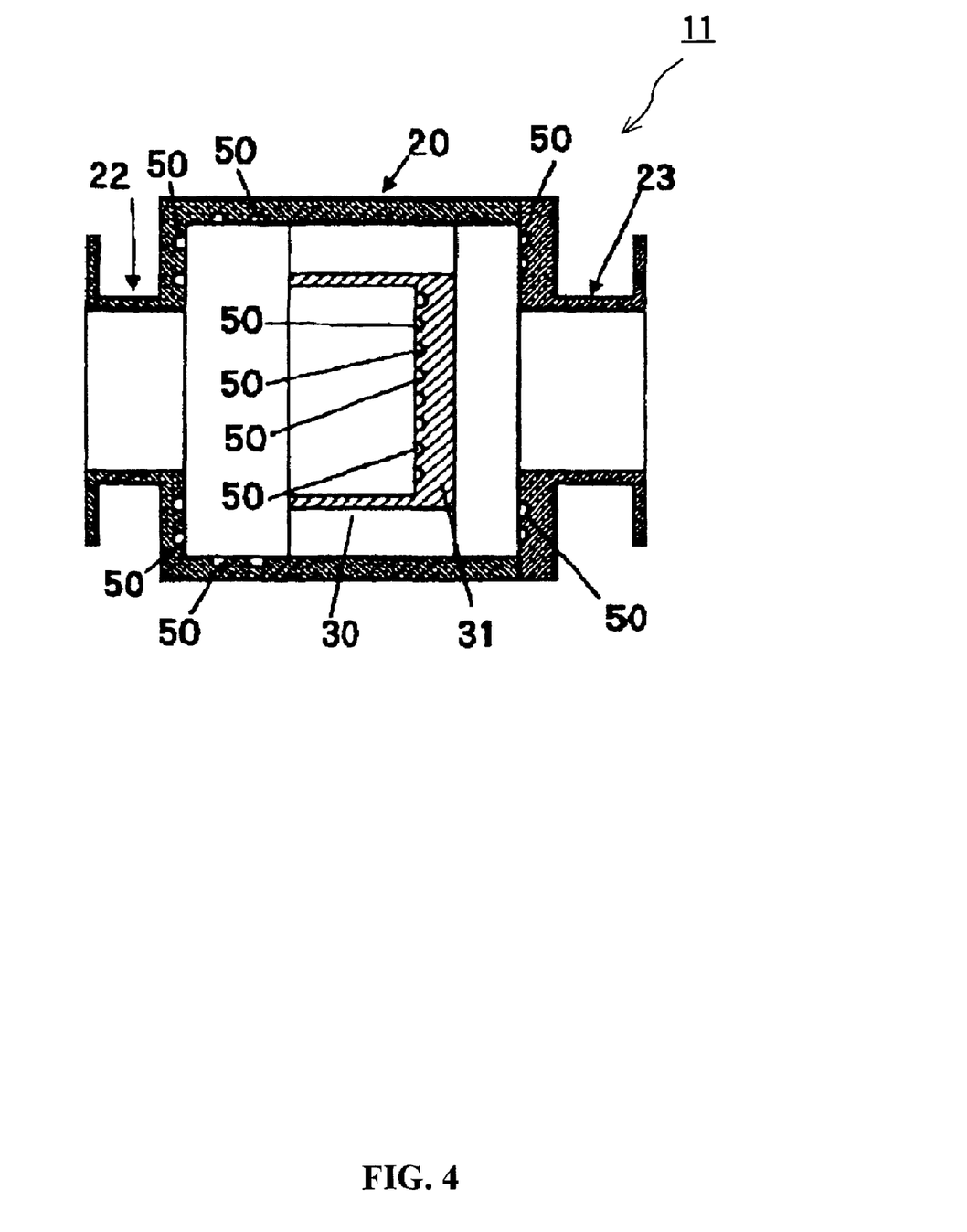
FIG. 4 is a cross sectional explanatory diagram of a static mixer employed in another embodiment of a method of purifying a fluid of the invention.

In the embodiment shown in FIG. 4, the depressions 50 are formed on the interior side of the bottom face 31 of the collision cylinder, the upstream face of the hollow outlet disk unit 23, the downstream face of the hollow inlet disk unit 22, and the inner peripheral face of the mixer main body cylindrical unit 21. The collision of the exhaust gas and the ozone gas on the inner peripheral face of the mixer main body cylindrical unit 21 in the approximately orthogonal direction is occurred only at the upstream part thereof, therefore, in the embodiment, the depressions 50 are formed on only the upstream part of the inner peripheral face part of the mixer main body cylindrical unit 21.

Figure 5:
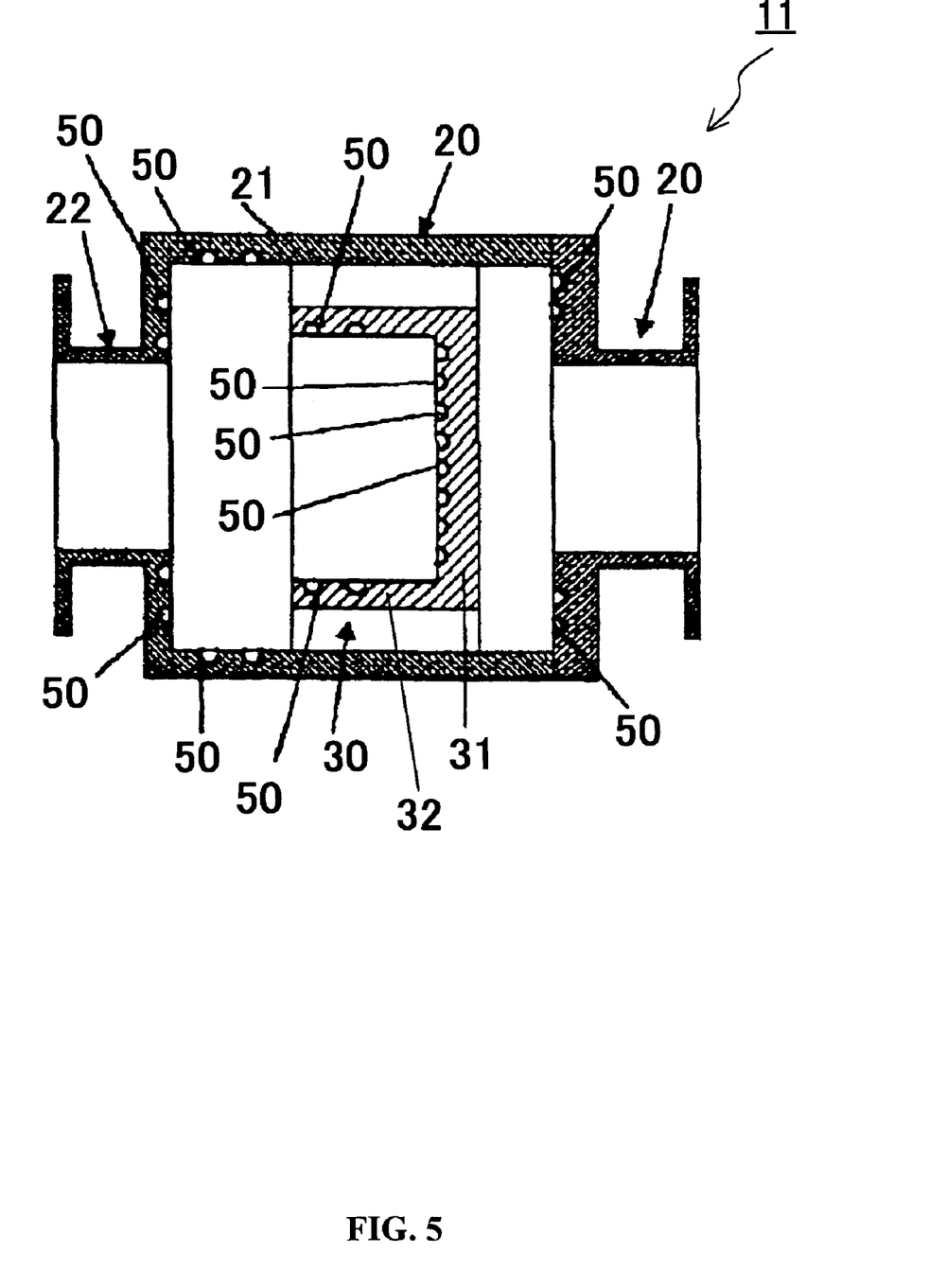
FIG. 5 is a cross sectional explanatory diagram of a static mixer employed in still another embodiment of a method of purifying a fluid of the invention.

In the embodiment shown in FIG. 5, the depressions 50 are formed on the interior side of the bottom face 31 of the collision cylinder 30, the downstream face of the hollow inlet disk unit 22, the upstream face of the hollow outlet disk unit 23, the inner peripheral face of the mixer main body cylindrical unit 21, and the inner peripheral face of the cylindrical part 32 of the collision cylinder. The exhaust gas and the ozone gas scarcely collide in the approximately orthogonal direction with the inner peripheral face of the cylindrical part 32, and the turbulent flow sort of collides only with the upstream part of the inner peripheral face of the cylindrical part 32. Therefore, in the embodiment, the depressions 50 are formed only on the upstream part of the inner peripheral face of the cylindrical part 32.

The depression 50 is a small pit in an appropriate shape. Generally, the depression 50 which has a semicircular shape at cross section is employed, also the one which has a rectangular shape or the triangular shape at cross section may be employed.

The distance between the edge of the opening 30a of the collision cylinder 30 and the hollow inlet disk unit 22 is determined depending on the purpose for mixing and depending on the difference of the mixture of between gases each other, between fluids each other, or between gas and liquid. The area corresponding to the above distance, that is the distance multiplied by a girth, may be greater than the cross sectional area of the opening 30a of the collision cylinder 30 and may be smaller than thereof, that is, may be accordingly determined depending on the purpose of mixing and the property and condition of a fluid. In a similar manner mentioned above, the distance of each part passing through a fluid may be determined depending on the purpose of mixing and the property and condition of fluid.

In other words, the exhaust gas and the ozone gas which flow from the inlet 22a into the mixer main body cylindrical unit 21 inflow to the collision cylinder 30, turn around, pass through the space which is made by the distance between the edge of the opening 30a of the collision cylinder 30 and the hollow inlet disk unit 22, that is the space which is made by the distance determined accordingly, and pass through the space, which is accordingly determined as the same way mentioned above, between the outer peripheral face of the collision cylinder 30 and the inner peripheral face of the mixer main body cylindrical unit 21.

Figure 6:
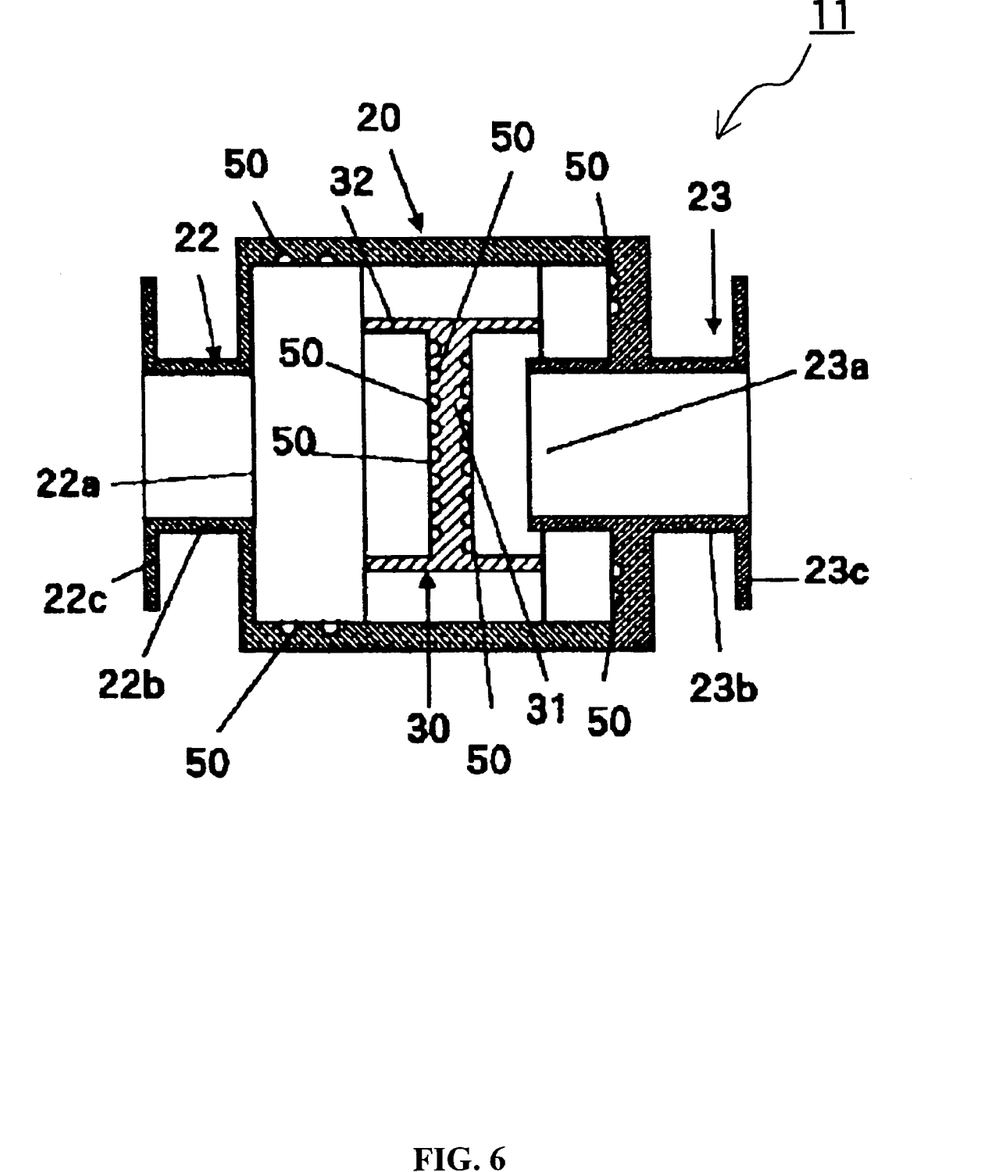
FIG. 6 is a cross sectional explanatory diagram of a static mixer employed in still another embodiment of a method of purifying a fluid of the invention.

In the embodiment shown in FIG. 6, the collision cylinder 30 has openings at the upstream side and the downstream side and is divided by the bottom face 31 at the center of the collision cylinder. The edge of the outlet cylindrical part 23b is protruded for the predetermined distance into the opening of the downstream side of the cylindrical part 32 of the collision cylinder 30. That is, in the upstream side of the outlet 23a, the outlet cylindrical part 23b or the downstream side fluid flow path 10b is protruded for the predetermined distance into the cylindrical part 32 of the collision cylinder 30 projecting from the downstream side of the bottom face 31 to have all of the exhaust gas and the ozone gas passing through a complicated flow path.

As mentioned above, where the outlet cylindrical part 23b is protruded for the predetermined distance into the cylindrical part 32 of the collision cylinder 30, the exhaust gas and the ozone gas have to climb over the protruding part, and then, the direction of the flow is subject to change furthermore. This improves the efficiency of mixing.

Figure 7:
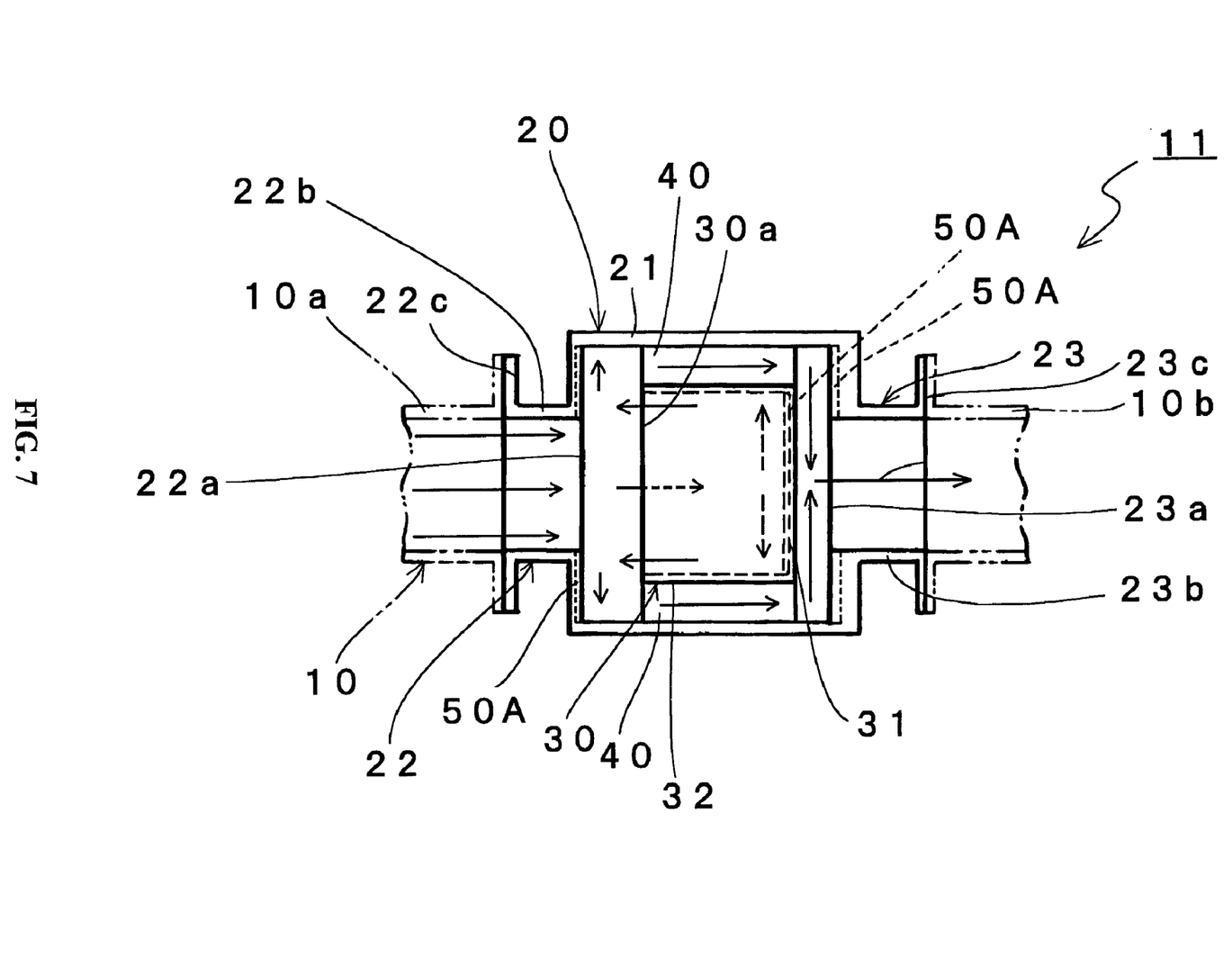
FIG. 7 is a cross sectional explanatory diagram of a static mixer employed in still another embodiment of a method of purifying a fluid of the invention.
Figure 8:
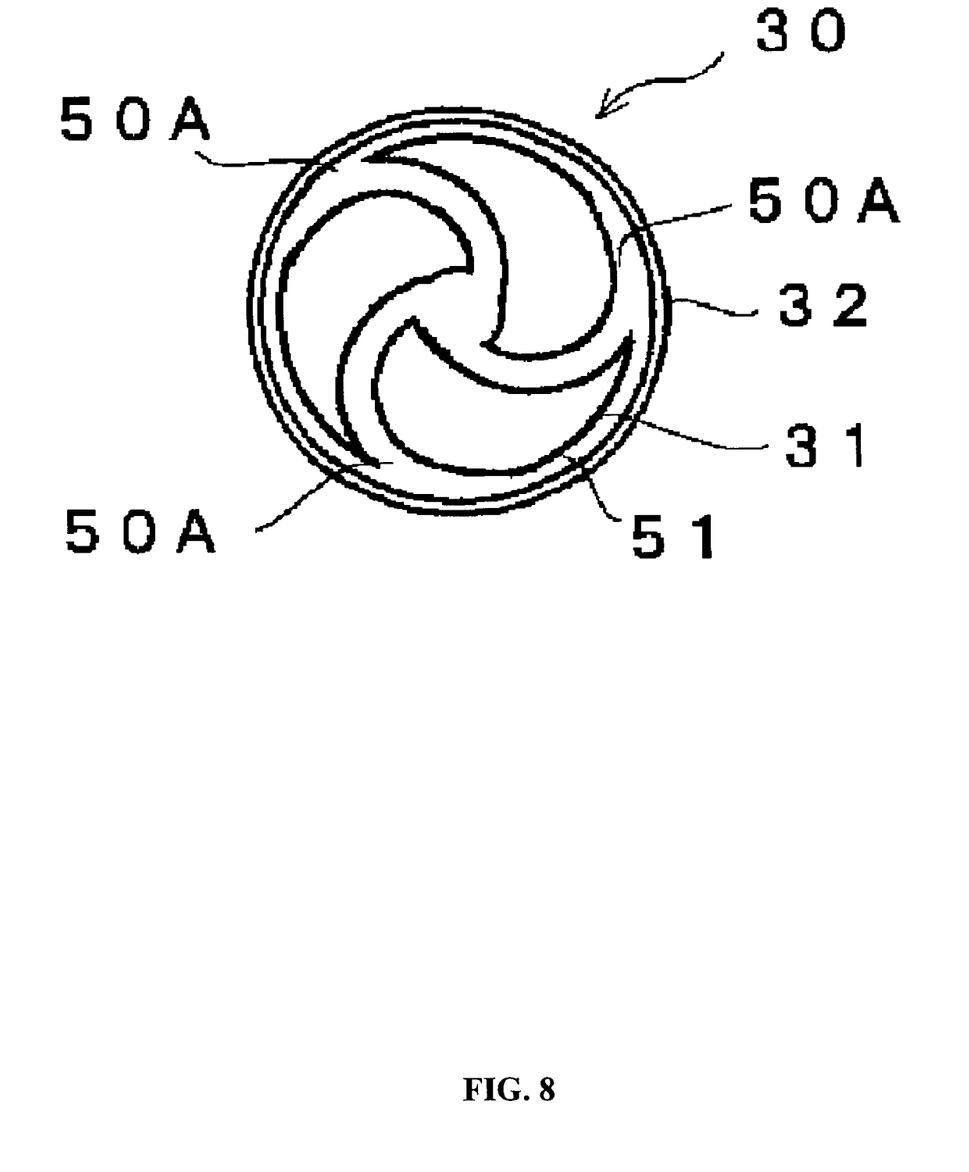
FIG. 8 is an explanatory diagram of a cross section in the axial direction of the center part of the static mixer in FIG. 7.
Figure 9:
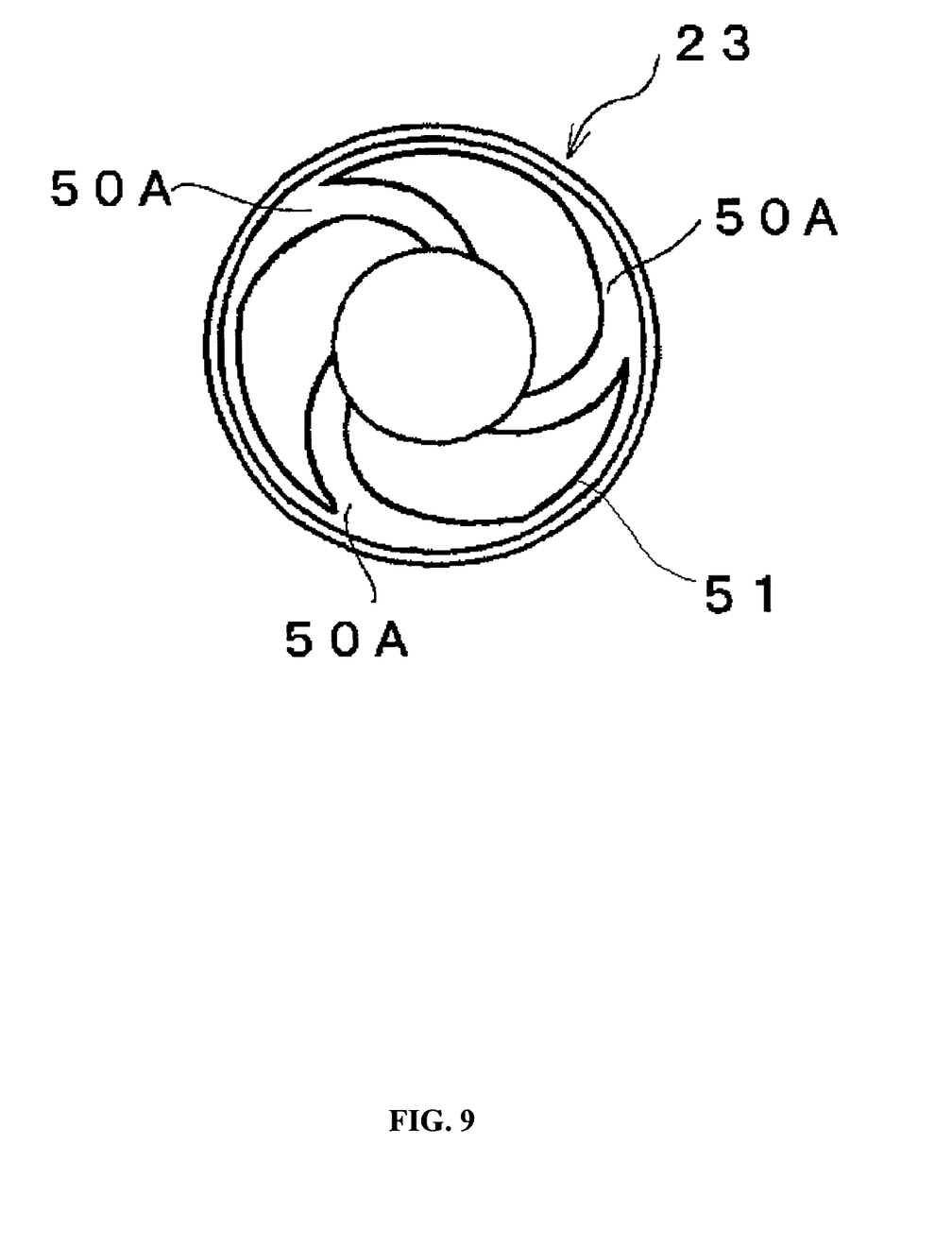
FIG. 9 is an explanatory diagram of a cross section in the axial direction of the downstream part of the static mixer in FIG. 7.

Referring to the embodiment shown in FIGS. 7 to 9, the triple-threaded volute grooves 50A shown in FIG. 8 are formed on the interior side of the bottom face 31 of the collision cylinder 30, and the triple-threaded volute grooves 50A shown in FIG. 9 are formed on the upstream face of the hollow outlet disk unit 23 and also on the downstream face of the hollow inlet disk unit 22.

The volute grooves 50A, shown in FIGS. 8 and 9, are formed on the interior side of the bottom face 31 of the collision cylinder 30, the downstream face of the hollow inlet disk unit 22, and the upstream face of the hollow outlet disk unit 23. The aforementioned faces are collided with the fluid most vigorously. Where the volute grooves 50A are formed on the faces, the powerful stirring action which generates many small eddy flows in the fluid collided with the volute grooves 50A, that is a differential agitation to stir and mix the fluid more finely, and rides the fine eddy flows on the overall big reverse flow, that is a integral agitation, is provided.

In this case, the annular grooves 51 having a depth approximately same as that of the volute groove 50A are formed on the outer regions of the bottom face 31 of the collision cylinder 30, on the outer regions of the downstream face of the hollow inlet disk unit 22, and on the outer regions of the upstream face of the hollow outlet disk unit 23, respectively. The tip of the volute groove 50A is touched to the annular groove. Without forming the annular groove 51, the tip of the volute groove 50A may be directly touched to the cylindrical part 32 or the mixer main body cylindrical unit 21.

Figure 10:
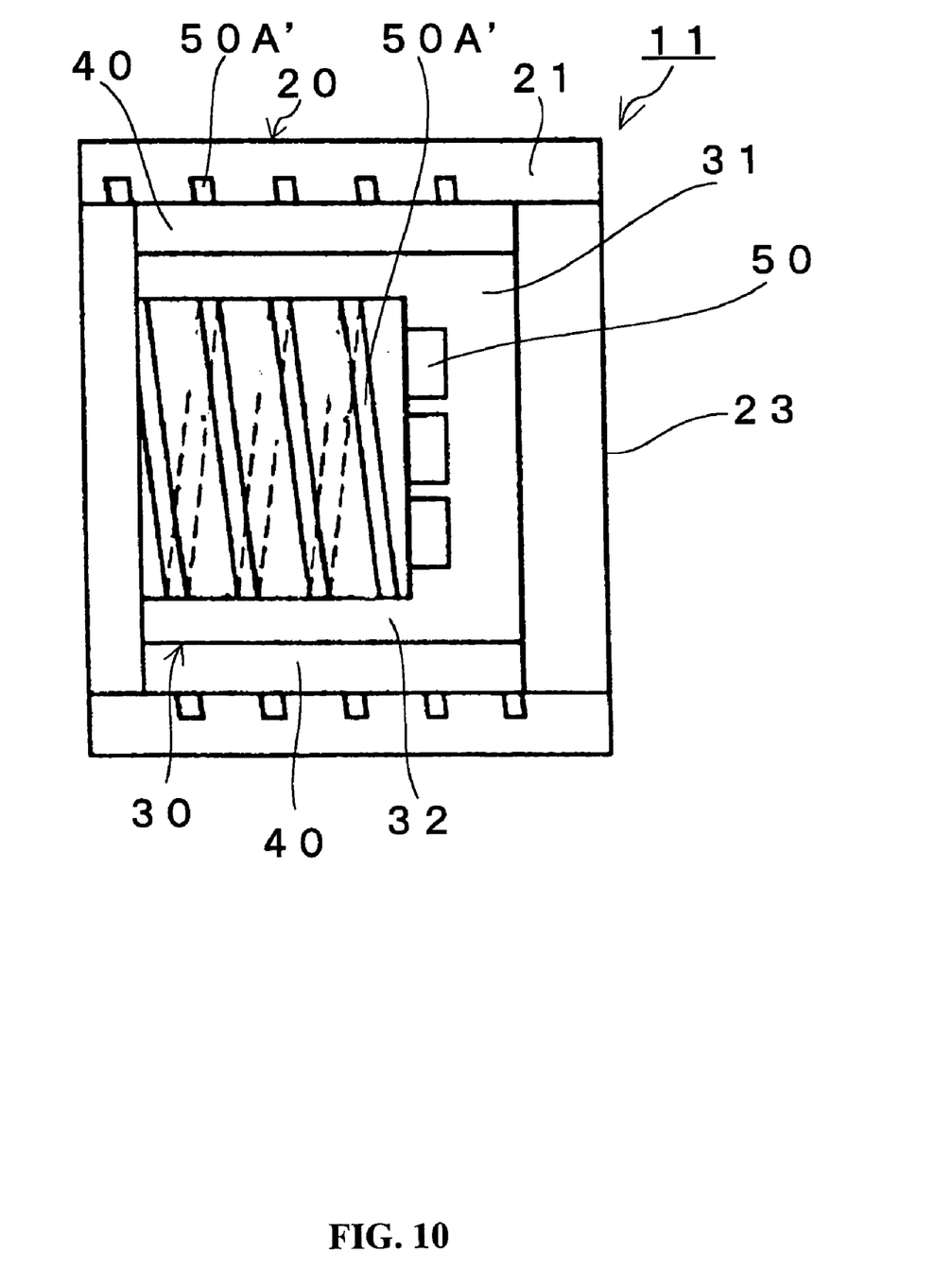
FIG. 10 is a cross sectional explanatory diagram of a static mixer employed in still another embodiment of a method of purifying a fluid of the invention.
Figure 11:
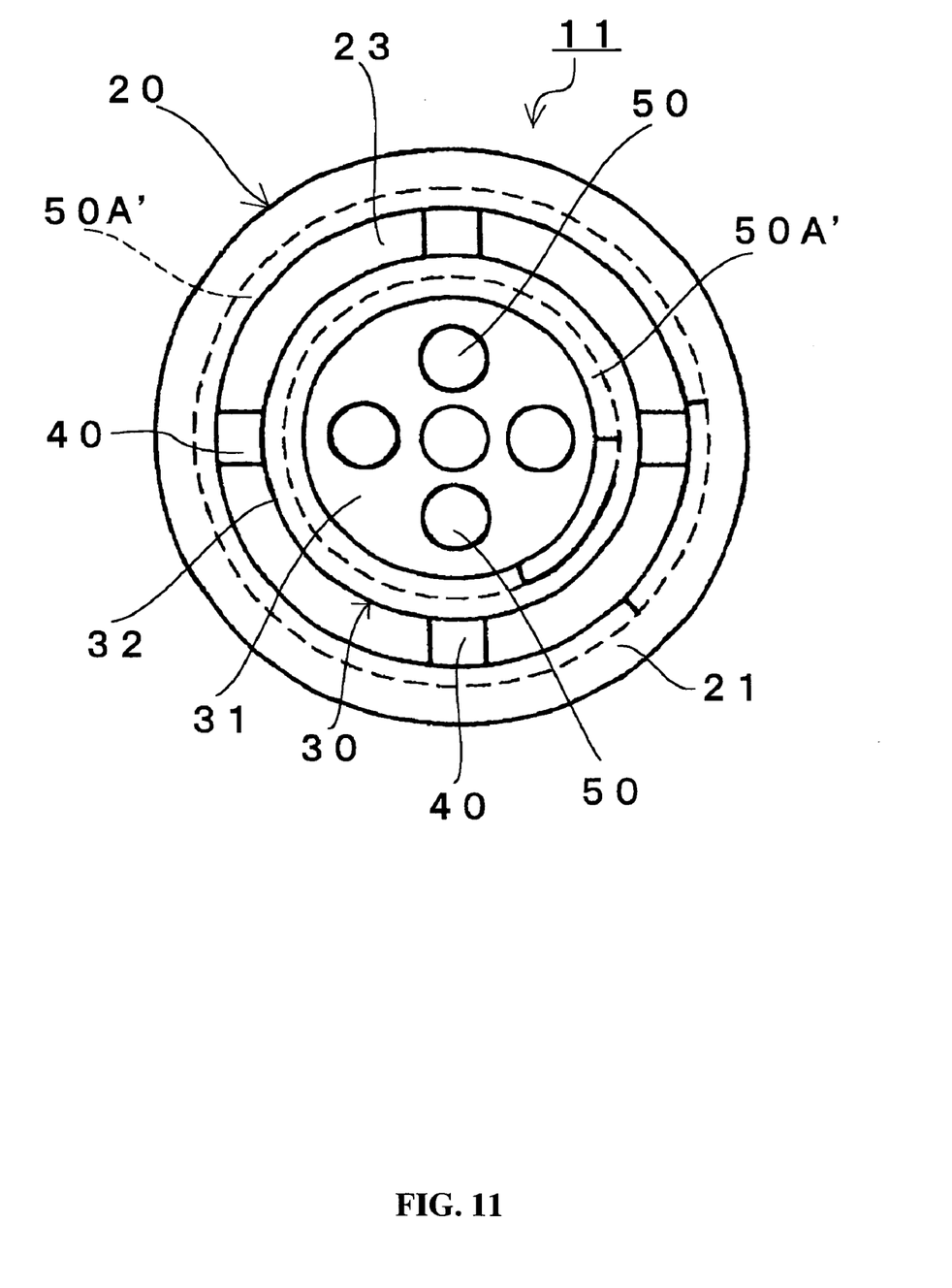
FIG. 11 is a cross sectional explanatory diagram in the direction corresponding to A-A in FIG. 2 of the static mixer in FIG. 10.

In the embodiment shown in FIGS. 10 and 11, more than one depression is formed on interior side of the bottom face 31 of the collision cylinder 30, and the spiral groove 50A' is formed on the inner peripheral face of the cylindrical part 32 of the collision cylinder 30 and on the inner peripheral face of the mixer main body cylindrical unit 21.

As shown in FIGS. 10 and 11, in the embodiment mentioned above, more than one depression 50 is formed on the bottom face 31 of the collision cylinder 30, and spiral groove 50A' are formed on the inner peripheral face of the cylindrical part 32 of the collision cylinder 30 and on the inner peripheral face of the mixer main body cylindrical unit 21 respectively. The strong stirring action which generates many small eddy flows in the fluid collided with the depressions 50 and the spiral groove 50A', that is a differential agitation, to stir and mix the fluid more finely, and rides the fine eddy flows on overall big reverse flow, that is a integral agitation is provided.

The depression, the groove, and the protrusion may be formed on the exterior side of the bottom face 31 of the collision cylinder 30, the outer peripheral face of the cylindrical part 32 of the collision cylinder 30, the downstream face of the hollow inlet disk unit 22 of the mixer main body 20, the outer peripheral face of the outlet cylindrical part 23b which is protruded for the predetermined distance into the downstream side opening of the cylindrical part 32 of the collision cylinder 30.

The fixing boards 40 are radially arranged from the outer peripheral face of the collision cylinder 30 and may be twisted at the predetermined angle around the axis of the collision cylinder in order to connecting the outer peripheral edge to the inner peripheral face of the mixer main body cylindrical part 21. As mentioned above, in virtue of employing a twisted board as the fixing board 40, a spiral flow is created in the fluid to enable more uniformly and effectively stirring and mixing.

Furthermore, a spiral ribbon may be attached to the inner peripheral face of the inlet cylindrical part 22b which is connected to the inlet 22a. The structure mentioned above makes the exhaust gas and the ozone gas flow with spiraling from the inlet cylindrical part 22b, that is from the inlet 22a, and brings in the action and effect same as the aforementioned embodiment.

The ozone gas which is fed from an ozone gas supply device 12 and has a gas concentration of 8 g/hr feeds into the fluid flow path 10 in which the exhaust gas including a toluene gas flows at a flow velocity of 140 L/min, and the said gases are mixed and reacted in the static mixer 11. Then, carrying out the measurement by a detector tube measurement method in the downstream space of the static mixer 11, the toluene which is included the exhaust gas and amounts 360 to 1000 ppm was decreased to the one amounts to 0.1 to 10 ppm.

In other words, it was proved that the method for purifying a fluid mentioned above enables to purify an exhaust gas efficiently and infallibly.

In addition, on the occasion of purifying the said fluid, the static mixer 11 measures less than 30 cm in length, and the residence time, that is the reaction time, of the exhaust gas and the ozone gas in the static mixer 11 is within one hundredth of a second. These demonstrate the feasibility of both of the simplification of an apparatus for use in the purification and the markedly reduction of the cost required for the purification.

Figure 12:
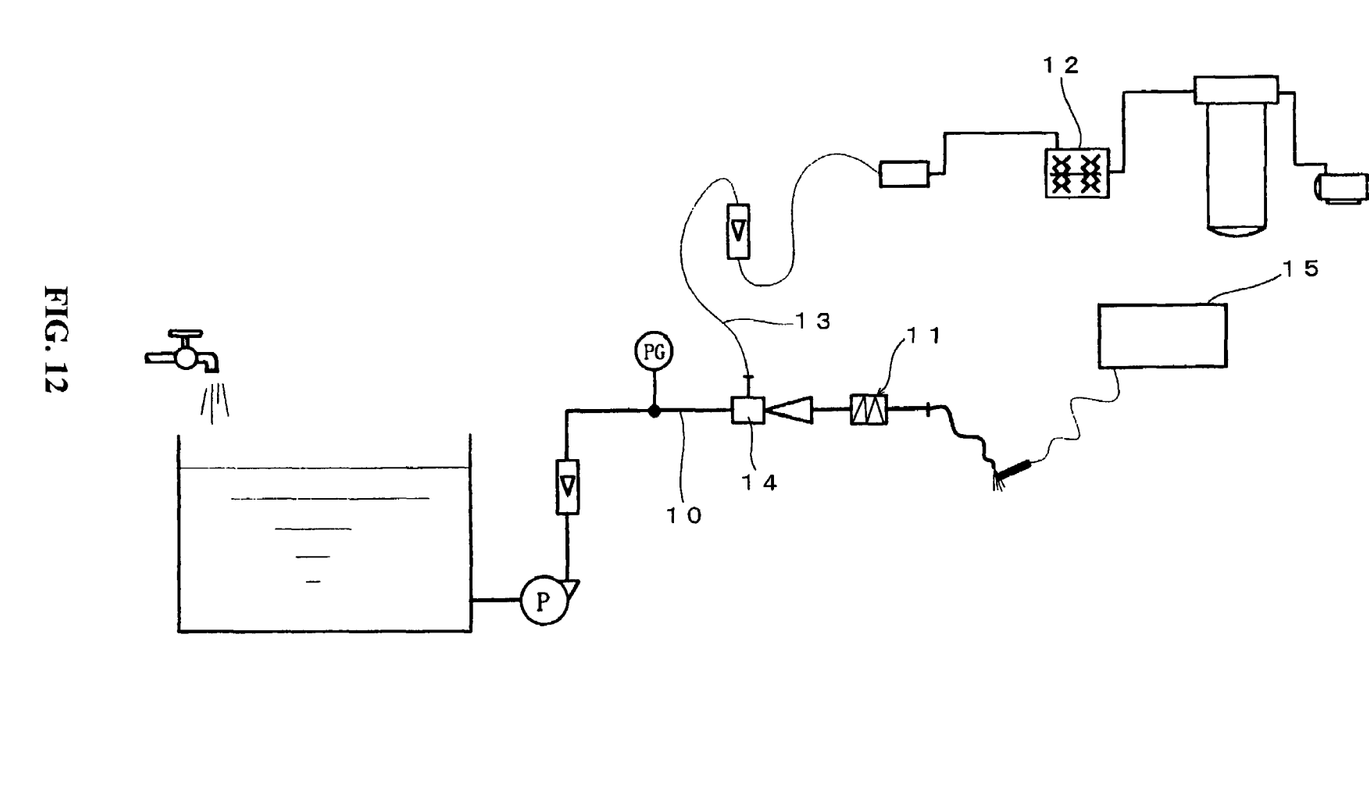
FIG. 12 is an explanatory diagram of a pipe arrangement showing the formation applying a static mixer of the invention to another fluid purification.

Further, when ozone is dissolved in water utilizing the static mixer 11, as shown in FIG. 12, the static mixer 11 is placed on the fluid flow path 10 in which tap water flows at 10 L/min, an ejector 14 which is placed upstream of the static mixer 11 is communicated with the ozone gas feed passage 13 which connects to the ozone gas feeding device 12, the ozone gas which flows from the ozone gas feeding device 12 and has a gas concentration of 3.6 g/hr is mixed and reacted with the tap water in the static mixer 11, thereby the ozone gas is dissolved in water.

In the condition mentioned above, the concentration of an ozone solution of a sample which was taken from a point downstream of the static mixer 11 was measured using an ozone solution concentration meter 15. Consequently, it was ascertained that, regardless of high or low of the gas concentration, the ozone gas was instantaneously dissolved in water and reached a saturated concentration at a fraction of the time.

That is, it was demonstrated that the method for dissolving gas using the static mixer 11 mentioned above enables ozone gas to be dissolved in water efficiently and infallibly, and accordingly the consumption of ozone gas to be cut down.

In using the static mixer which has been invented by the inventors of the present invention themselves and was disclosed in the Japanese Patent Application Number 8-143514, that is the static mixer 11 shown in FIGS. 2 to 6, the concentration of the ozone solution mentioned above measures 12 ppm. In using the static mixer which is made improvement on the aforesaid static mixer, that is the static mixer shown in FIGS. 7 to 11, the concentration of the ozone solution mentioned above measures 17 ppm. As described above, the static mixer 11 which is made an improvement on the one which has been invented by the inventors of the present invention and was disclosed in the Japanese Patent Application Number 8-143514 enables to dissolve ozone gas more efficiently.

Figure 13:
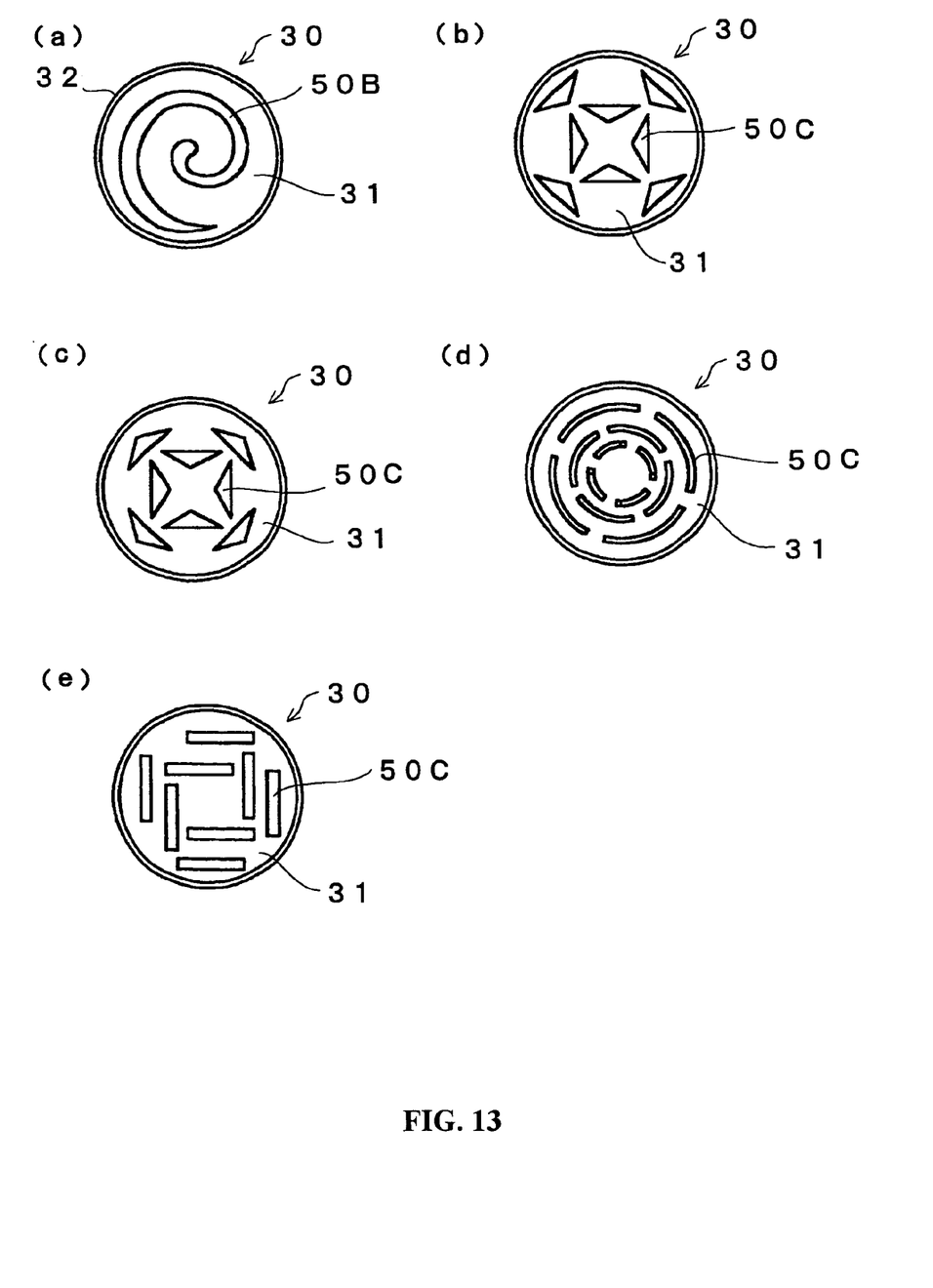
FIGS. 13(a) to 13(e) are explanatory diagrams of the bottom faces which are showed another embodiments of grooves and protrusions of a collision cylinder of a static mixer of the invention.

In a method for purifying a fluid and a static mixer of the invention, a groove or a protrusion which is formed on the upstream or outstream side of the bottom face 31 of the collision cylinder 30, the interior face of the hollow inlet disk unit 22 of the mixer main body 20, and the interior face of the hollow outlet disk unit 23 of the mixer main body 20, that is on the part facing to the flow of fluid, maybe formed a single threaded volute groove 50B as shown in FIG. 13(a) and plural protrusions 50C as shown in FIGS. 13(b) to 14(e).

Further, the embodiments described above shows the instance which the static mixer of the invention is applied to the purification of exhaust gas and the dissolution of gas. More concretely, it is naturally practicable that the static mixer is applied to smoke eliminating systems in restaurants, air purification systems, including disinfection systems, in hospitals and ambulances, dioxin elimination systems, and the like.

INDUSTRIAL APPLICABILITY

As explained in the foregoing, a static mixer of the invention, which has the structure as described above, provides a low loss of pressure and high efficiency of stirring and mixing. Through using the static mixer for purifying an exhaust gas, waste water, and the like, the simplification of an apparatus for use in the purification and the markedly reduction of the cost required for the purification are achieved, and the excellent effect of purifying a fluid extremely efficiently is accomplished.

In furthermore preferred embodiment of the invention, a method for purifying a fluid and a static mixer is provided with the collision cylinder into which either the upstream side of the outlet cylindrical part of the hollow outlet disk unit or the upstream end of the downstream side fluid flow path is protruded, and then enables to mix and stir more efficiently.

The invention claimed is:

1. A method for purifying a fluid which comprises, in purifying a fluid, such as an exhaust gas and waste water,
   utilizing a static mixer which is provided with a mixer main body which is arranged on a fluid flow path and is formed in a cylindrical shape having a diameter greater than that of the fluid flow path, the mixer main body comprising a mixer main body cylindrical unit, a hollow inlet disk unit having a hollow part which is positioned at the end of the mixer main body cylindrical unit and serves as an inlet, and a hollow outlet disk unit having a hollow part which is positioned at the other end of the mixer main body cylindrical unit and serves as an outlet, wherein a collision cylinder having a diameter greater Than or equal to that of the inlet of the mixer main body and smaller than the inside diameter of the mixer main body cylindrical unit of the mixer main body is fixedly housed concentrically in the mixer main body so that the side of the opening of the collision cylinder faces to the inlet, a groove is provided on at least one part of the interior face of the mixer main body and the surface of the collision cylinder which have contact with the fluid, wherein the groove provided on a plane which has contact with the fluid and faces the flow of the fluid are formed in volute shapes, and the groove provided on a peripheral face which has contact with the fluid and places along the flow of the fluid are formed in spiral shapes,
   arranging on the fluid flow path at least one of the static mixers,
   occurring a mixed reaction between the fluid, such as the exhaust gas and the waste water, and a depurative, such as ozone, and
   purifying The fluid.

2. A method for purifying a fluid according to claim 1, wherein the groove of the static mixer is provided on either the interior side of the bottom face of the collision cylinder or the inner peripheral face of the cylindrical part of the collision cylinder, or both.

3. A method for purifying a fluid according to claim 2, wherein the upstream end of the outlet cylindrical part of the hollow outlet disk unit or the upstream end of the downstream side fluid flow path is protruded into the mixer main body of the static mixer.

4. A method for purifying a fluid according to claim 1, wherein, the groove of the static mixer is provided on at least one part of the interior side of the bottom face of the collision cylinder, the inner peripheral face of the cylindrical part of the collision cylinder, the interior face of the hollow inlet disk unit of the mixer main body, and the interior face of the hollow outlet disk unit of the mixer main body.

5. A method for purifying a fluid according to claim 1, wherein the groove of the static mixer is provided on either the interior side of the bottom face of the collision cylinder or the inner peripheral face of the cylindrical part of the collision cylinder, or both.

6. A method for purifying a fluid according to claim 1, wherein the upstream end of the outlet cylindrical part of the hollow outlet disk unit or the upstream end of the downstream side fluid flow path is protruded into the mixer main body of the static mixer.

7. A method for purifying a fluid according to claim 1, wherein the upstream end of the outlet cylindrical part of the hollow outlet disk unit or the upstream end of the downstream side fluid flow path is protruded into the mixer main body of the static mixer.

8. A static mixer comprising a mixer main body which is arranged on the fluid flow path and is formed in cylindrical shape having a diameter greater than that of the fluid flow path, the mixer main body comprising a mixer main body cylindrical unit, a hollow inlet disk unit having a hollow part which is positioned at the end of the mixer main body cylindrical unit and serves as an inlet, and a hollow outlet disk unit having a hollow part which is positioned at the other end of the mixer main body cylindrical unit and serves as an outlet,
   wherein a collision cylinder having a diameter greater than or equal to that of the inlet of the mixer main body and smaller than the inside diameter of the mixer main body cylindrical unit is fixedly housed concentrically in the mixer main body so that the side of the opening of the collision cylinder faces to the inlet, and
   a groove is provided on at least one part of the interior face of the mixer main body and the surface of the collision cylinder which have contact with the fluid, wherein the groove provided on a plane which has a contact with the fluid and faces the flow of the fluid is formed in volute shapes, and the groove provided on a peripheral face which has contact with the fluid and places along the flow of the fluid is formed in spiral shapes.

9. A static mixer according to claim 8, wherein the groove is provided on at least one part of the interior side of the bottom face of the collision cylinder, the inner peripheral face of the cylindrical part of the collision cylinder, the interior face of the hollow inlet disk unit of the mixer main body, and the interior face of the hollow outlet disk unit of the mixer main body.

10. A method for mixing fluids comprising, in mixing between two fluid mutually, arranging one or more of the static mixers according to claim 9 on a fluid flow path, and
   mixing and reacting one fluid with the other fluid in the static mixer to mix the fluids each other.

11. A method for mixing fluids comprising, in mixing between two fluid mutually,
   arranging one or more of the static mixers according to claim 8 on a fluid flow path, and
   mixing and reacting one fluid with the other fluid in the static mixer to mix the fluids each other.

* * * * *